US011933081B2

(12) United States Patent
Cho

(10) Patent No.: US 11,933,081 B2
(45) Date of Patent: Mar. 19, 2024

(54) VEHICULAR DOOR-OPENING-AND-CLOSING DEVICE

(71) Applicants: Hyundai Motor Company, Seoul (KR); Kia Corporation, Seoul (KR)

(72) Inventor: Kuk Hyun Cho, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 124 days.

(21) Appl. No.: 17/502,584

(22) Filed: Oct. 15, 2021

(65) Prior Publication Data

US 2023/0003057 A1 Jan. 5, 2023

(30) Foreign Application Priority Data

Jun. 30, 2021 (KR) ........................ 10-2021-0085484

(51) Int. Cl.

| | |
|---|---|
| ***E05B 81/08*** | (2014.01) |
| ***E05B 47/00*** | (2006.01) |
| ***E05B 81/18*** | (2014.01) |
| ***E05B 83/36*** | (2014.01) |
| ***E05B 85/24*** | (2014.01) |

(52) U.S. Cl.

CPC .......... *E05B 81/08* (2013.01); *E05B 47/0002* (2013.01); *E05B 47/0038* (2013.01); *E05B 81/18* (2013.01); *E05B 83/36* (2013.01); *E05B 85/243* (2013.01)

(58) Field of Classification Search

CPC .......... E06B 5/164; E06B 7/18; E05B 17/002; E05B 65/1006; E05B 65/1053

See application file for complete search history.

(56) References Cited

U.S. PATENT DOCUMENTS 2,039,433 A * 5/1936 McNeill .............. E05B 47/0047 16/84
3,620,560 A * 11/1971 Peters ................. E05B 47/0607 292/216
4,395,064 A * 7/1983 Bellot ..................... E05B 81/20 292/201
5,520,424 A * 5/1996 Hapke ..................... D06F 37/42 292/341.17
8,533,998 B2 * 9/2013 Nishikibe ............... E05B 81/68 49/280
9,174,597 B2 * 11/2015 Ghannam ........... B60R 21/0134
2005/0184532 A1 * 8/2005 Karcz ..................... E05B 63/20 292/163
2005/0218663 A1 * 10/2005 Schupp ................... E05B 81/14 292/216
2006/0049645 A1 * 3/2006 Drumm ................. E05C 19/163 292/251.5

(Continued)

FOREIGN PATENT DOCUMENTS

JP S6446362 U * 3/1989

*Primary Examiner* — Mark A Williams
(74) *Attorney, Agent, or Firm* — Slater Matsil, LLP

(57) ABSTRACT

An embodiment vehicular door-opening-and-closing device includes a latch, a striker configured to be lockably fitted into the latch, and a magnet configured to maintain the striker in a state of being fitted into the latch. In an embodiment, the magnet has a magnetic force exceeding a repulsive force of a weather strip generated by compression of the weather strip, and the magnetic force exceeds the repulsive force in an initial operation of opening a vehicle door.

20 Claims, 6 Drawing Sheets

(56) References Cited

U.S. PATENT DOCUMENTS

| | | | | |
|---|---|---|---|---|
| 2009/0195000 A1* | 8/2009 | Howey | E05C 19/163 | 292/251.5 |
| 2010/0032968 A1* | 2/2010 | Cavallucci | H02K 7/116 | 292/341.16 |
| 2012/0299313 A1* | 11/2012 | Organek | E05B 81/06 | 292/129 |
| 2014/0265366 A1* | 9/2014 | Ambrosi | B32B 3/06 | 292/251.5 |

* cited by examiner

VEHICULAR DOOR-OPENING-AND-CLOSING DEVICE

CROSS-REFERENCE TO RELATED APPLICATIONS

This application claims the benefit of Korean Patent Application No. 10-2021-0085484, filed on Jun. 30, 2021, which application is hereby incorporated herein by reference.

TECHNICAL FIELD

The present disclosure relates to a vehicular door-opening-and-closing device.

BACKGROUND

As is well known in the art, a latch 20 is mounted on the rear end of a door 10 of a vehicle and a striker 40 is mounted on the vehicle body 30 so as to be lockable to the latch 20 for operation of opening and closing the door of the vehicle, and a compressible weather strip 50 is mounted in the region of the surface of the vehicle body 30 that faces the inner edge of the door 10 for water and air sealing of the door 10, as illustrated in FIG. 1.

The weather strip 50 serves to perform a waterproofing function in the case of rain and to block wind noise generated due to the pressure difference between indoor air and outdoor air during driving.

FIGS. 2A and 2B are vertical cross-sectional views illustrating a latch and a striker among the components of a conventional door-opening-and-closing device.

As illustrated in FIGS. 2A and 2B, the latch 20 includes a claw 21 having an engaging groove 22, into which the striker 40 is removably fitted, and a pawl 24 configured to hold the claw 21 at a position for locking of the striker 40 or to release the held state of the claw 21.

The claw 21 is provided at the entry of the engaging groove 22 thereof with an engaging end 23 projecting therefrom, and the pawl 24 is provided with an engaging step 25, which is engaged with the engaging end 23.

Furthermore, the rotating shaft 26 of the claw 21 is provided with a first return spring 27 configured to apply elastic restoring force to the claw 21 to rotate the claw 21 in the direction in which the locked state of the striker 40 is released, and the rotating shaft 28 of the pawl 24 is provided with a second return spring 29, configured to apply elastic restoring force to the pawl 24 in the direction in which the claw 21 is locked to the striker 40 (the engaging end 23 is engaged with the engaging step 25).

Referring to FIG. 2A, in the locked state of the door, the striker 40 mounted on the vehicle body 30 is fitted into the engaging groove 22 in the claw 21, among the components of the latch 20, so as to be locked thereto, and is maintained in the locked state. Furthermore, the engaging end 23 of the claw 21 is engaged with the engaging step 25 of the pawl 24 such that the claw 21 is positioned so as to lock the striker 40.

At this point, the weather strip 50 is maintained in the compressed state by the closing pressure of the door 10, and applies repulsive force for pushing the door 10 in the opening direction (see the arrow in FIG. 2A).

Meanwhile, when a user operates a door lever 12 (see FIG. 1) mounted on the outer surface of the door 10 in the opening direction, the pawl 24 among the components of the latch 20, which is actuated in conjunction with the door lever 12, is rotated in a clockwise direction (in which the locked state of the claw 21 is released). Accordingly, as illustrated in FIG. 2B, the engaging end 23 of the claw 21 is released from the engagement with the engaging step 25 of the pawl 24, and the claw 21 is rotated by the elastic restoring force of the first return spring 27 in the direction in which the locked state of the striker 40 is released (in the clockwise direction in FIG. 2B), whereby the engaging groove 22 in the claw 21 is rotated so as to allow the striker 40 to escape therefrom.

When the claw 21 is rotated to a position such that the striker 40 can escape therefrom, the door 10 is first momentarily opened to a predetermined angle by the repulsive force of the weather strip 50 acting on the door 10 to push the door 10. Subsequently, when a user pulls the door 10 to the outside, the door 10 is further opened to an angle desired by a user.

However, the conventional door-opening-and-closing device has the following problems when an operation for opening a door is performed.

Because an actuation in which the pawl 24 is rotated in a counterclockwise direction (in which the claw 21 is released from the engaged state) and the engaging end 23 of the claw 21 is thus disengaged from the engaging step 25 of the pawl 24, an actuation in which the claw 21 is rotated in a direction by the elastic restoring force of the first return spring 27 such that the striker 40 is released from the locked state, and an actuation in which the striker 40 escapes from the engaging groove 22 in the claw 21 while the door 10 is momentarily pushed outwards by the repulsive force of the weather strip 50, thereby allowing the door 10 to be opened to a predetermined angle, are successively performed in a very short time, there is a problem in which a sound caused by momentary rotational actuation of the pawl 24 and the claw 21, a contact sound generated when the striker 40 instantaneously escapes from the engaging groove 22 in the claw 21, and the like are amplified through the internal space in the door panel and are transmitted to a user's ear as noise.

In other words, when the door 10 is momentarily pushed in the opening direction by the repulsive force of the weather strip 50 and the striker 40 escapes from the engaging groove 22 in the claw 21, thereby allowing the door 10 to be opened to a determined angle, the door 10 is not in the state of being in close contact with the weather strip 50 (i.e., the state of preventing vibration is released). At this point, because the internal space in a door panel constituting the door 10 serves to amplify a vibrational sound and an operational sound caused by rotation of the pawl 24 and the claw 21 and a contact sound generated when the striker 40 escapes from the claw 21, there is a problem in which the sounds are transmitted to a user's ear as noise.

The above information disclosed in this Background section is only for enhancement of understanding of the background of the invention and therefore it may contain information that does not form the prior art that is already known to a person of ordinary skill in the art.

SUMMARY

The present disclosure relates to a vehicular door-opening-and-closing device. Particular embodiments relate to a vehicular door-opening-and-closing device, which is configured to allow a door to be easily closed using magnetic force while reducing the amount of sound that is generated when the door is opened.

Embodiments of the present invention can solve problems associated with the prior art. An embodiment of the present invention provides a vehicular door-opening-and-closing device, which is configured such that, even though the repulsive force of a weather strip is applied to the door when operation of a pawl and a claw of a latch for opening of the door is performed, a striker is continuously positioned in an engaging groove in the claw by the magnetic force of a magnet, and the door is maintained in the state of being in close contact with the weather strip so as to prevent vibration and is opened by a user pulling a door lever, whereby it is possible to prevent vibration and an operational sound, which are generated when the pawl and the claw are rotated, from being amplified through the internal space in the door, and it is thus possible to greatly reduce the amount of noise that is generated when the door is opened.

One embodiment of the present invention provides a vehicular door-opening-and-closing device including a latch and a striker configured to be lockably fitted into the latch, wherein a magnet, which has magnetic force exceeding the repulsive force of a weather strip mounted to a vehicle body, which is generated when the weather strip is compressed, is attached to a predetermined location of the vehicle body or a door such that the striker is maintained in a state of being fitted into the latch by virtue of the magnetic force exceeding the repulsive force of the weather strip even when the repulsive force of the weather strip is applied to the door when an operation for opening the door is performed.

In a preferred embodiment, the magnet may be embodied as a permanent magnet or an electromagnet.

In another preferred embodiment, the permanent magnet may be mounted at a location on the latch at which the permanent magnet can attract the striker using the magnetic force thereof.

In still another preferred embodiment, the permanent magnet may be mounted on the inner surface of a latch case adjacent to the claw of the latch into which the striker is lockably fitted.

In yet another preferred embodiment, the permanent magnet may be mounted at a location of the striker at which the permanent magnet can attract the latch.

In still yet another preferred embodiment, the permanent magnet may be mounted at a location of the latch at which the permanent magnet can attract the striker.

In a further preferred embodiment, the electromagnet may be mounted on an inner surface of a latch case adjacent to the claw of the latch into which the striker is lockably fitted.

In another further preferred embodiment, the electromagnet may be mounted at a location of the striker at which the electromagnet can attract the latch.

In still another further preferred embodiment, the vehicular door-opening-and-closing device may further include a controller configured to apply current to the electromagnet for magnetization of the electromagnet.

In yet another further preferred embodiment, the controller may be configured to apply current to the electromagnet upon receiving a signal indicating opening of the door from a smart key.

In still yet another further preferred embodiment, the controller may be configured to apply current to the electromagnet upon receiving a switching signal from a door switch when the door is closed and pushes the door switch.

Other aspects and preferred embodiments of the invention are discussed infra.

It is to be understood that the term "vehicle" or "vehicular" or other similar terms used herein are inclusive of motor vehicles in general, such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative-fuel vehicles (e.g. fuels derived from resources other than petroleum). As referred to herein, a hybrid vehicle is a vehicle that has two or more sources of power, for example a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes, will be determined in part by the particular intended application and use environment.

In the figures, the reference numbers refer to the same or equivalent parts of embodiments of the present invention throughout the several figures of the drawings.

DETAILED DESCRIPTION OF ILLUSTRATIVE EMBODIMENTS

Hereinafter, reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Hereinafter, preferred embodiments of the present invention will be described in detail with reference to the accompanying drawings.

Figure 1:
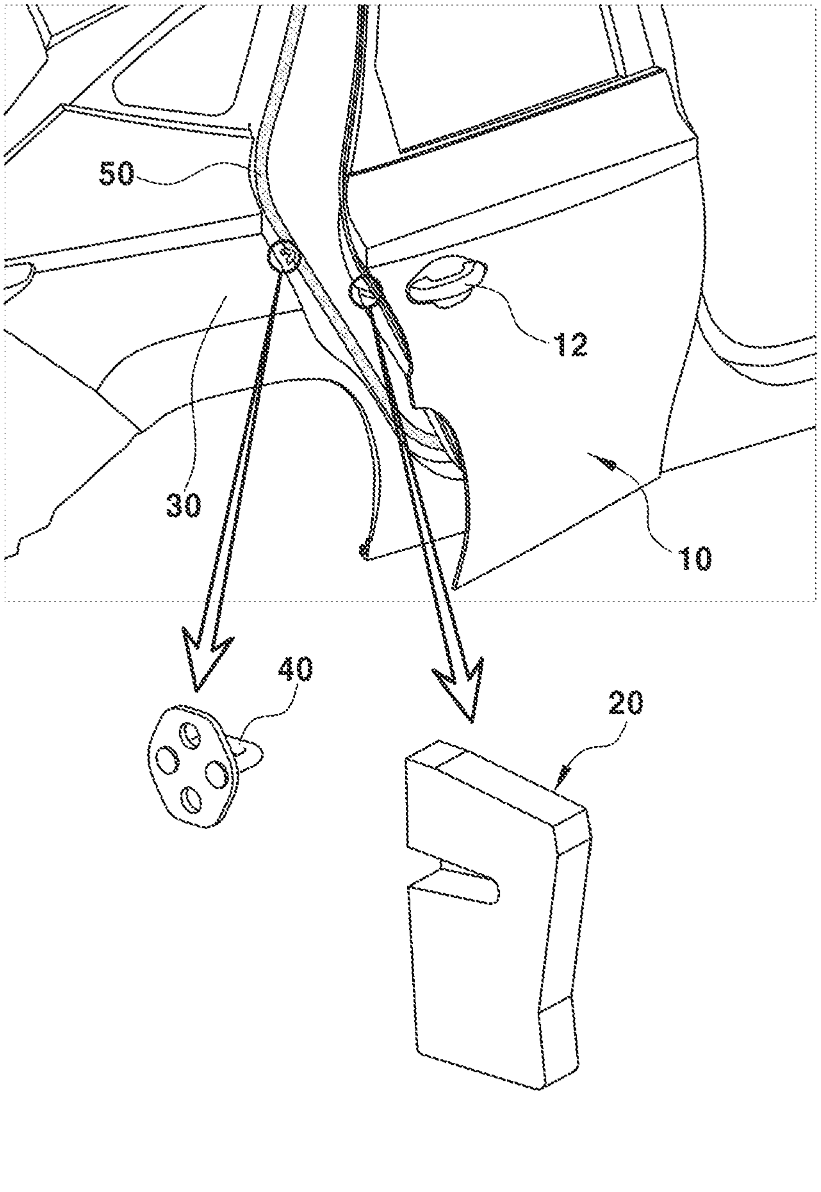
FIG. 1 is a schematic view illustrating a location on a vehicular door at which a latch is mounted and a location on a vehicle body at which a striker is mounted.
Figure 2A:
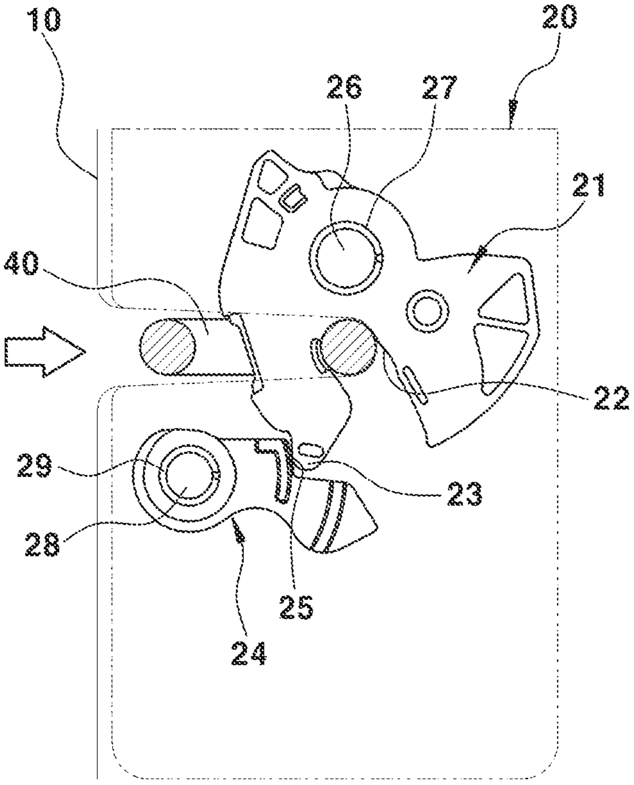
FIG. 2A is a longitudinal cross-sectional view illustrating a conventional arrangement in which a striker is lockably fitted into a latch when a door is closed.
Figure 2B:
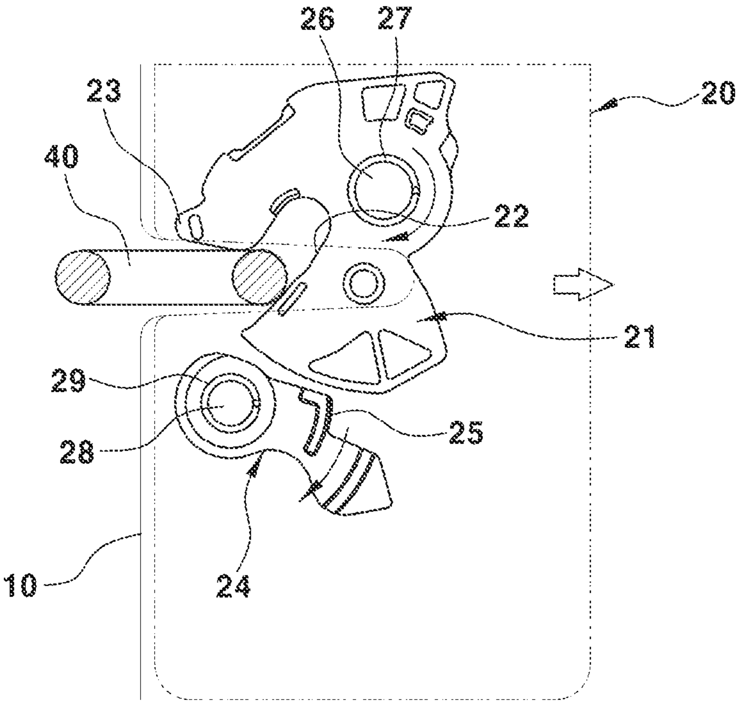
FIG. 2B is a longitudinal cross-sectional view illustrating a conventional arrangement in which a striker is ready to escape from the latch when the door is opened.

As described above with reference to FIG. 1, the latch 20 is mounted on the rear end of the door 10 of the vehicle and the striker 40 is mounted on the vehicle body 30 so as to be lockable to the latch 20 for opening and closing actuation of the door of the vehicle, and the weather strip 50 is compressibly mounted in the region of the surface of the vehicle body 30 that faces the inner edge of the door 10 for water and air sealing of the door 10.

According to an embodiment of the present invention, a magnet is attached to a predetermined location of the vehicle body 30 or the door 10. Embodiments of the present invention improve the closing performance of the door 10 and reduce vibration and sounds of the door 10 during opening of the door 10 by virtue of the magnet mounted on the vehicle body 30 or the door 10, which has magnetic force higher than the repulsive force of the weather strip 50 mounted to the vehicle body 30, which causes the weather strip 50 to be restored to the original position when the weather strip 50 is compressed.

Figure 3:
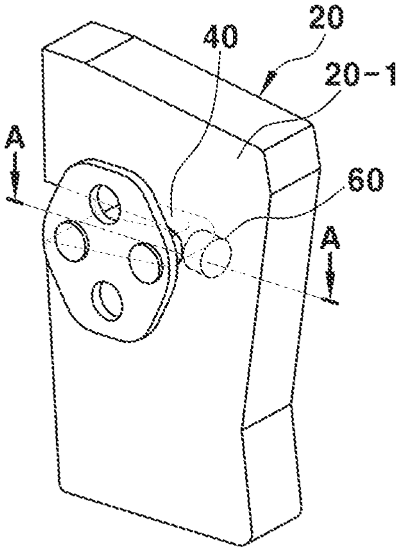
FIG. 3 is a perspective view illustrating a vehicular door-opening-and-closing device according to embodiments of the present invention, in which a magnet is mounted in a latch, into which a striker is fitted.
Figure 4:
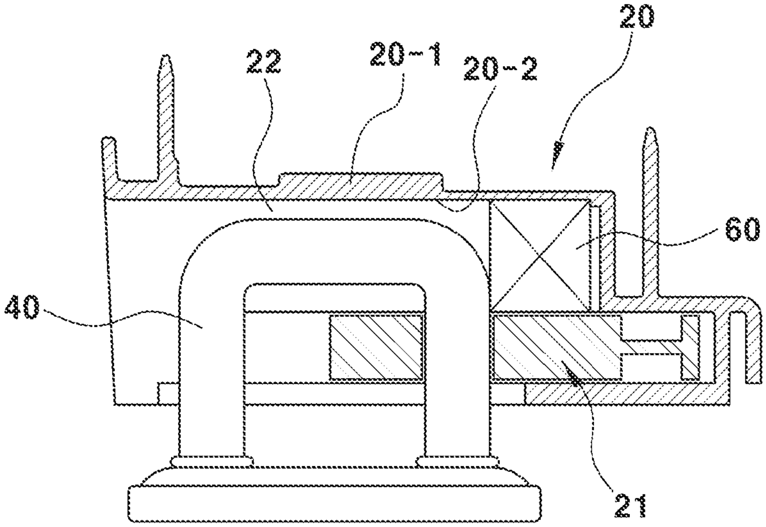
FIG. 4 is a cross-sectional view taken along line A-A in FIG. 3.

FIG. 3 is a perspective view illustrating a vehicular door-opening-and-closing device according to an embodiment of the present invention, in which the magnet is mounted to the latch into which the striker is fitted. FIG. 4 is a cross-sectional view taken along line A-A in FIG. 3.

As illustrated in FIGS. 3 and 4, the magnet 60 may be mounted at a position on the latch 20 mounted on the door at which the magnet 60 can pull the striker 40 using the magnetic force thereof. The magnet 60 may be embodied as a permanent magnet or an electromagnet.

When the magnet 60 is embodied as a permanent magnet 62, the permanent magnet 62 is mounted at a position on the latch 20, which is mounted on the door 10 at which the permanent magnet 62 can pull the striker 40 using the magnetic force thereof. As illustrated in FIGS. 5 to 8, the permanent magnet 62 may be mounted on the inner surface of a latch case 20-1 adjacent to the claw 21 of the striker 40, into which the striker 40 is lockably fitted.

Alternatively, although not shown in the drawings, the permanent magnet 62 may also be mounted in a region of the striker 40 so as to magnetically attract the latch 20 when the striker 40 is fitted into the latch 20.

Figure 5:
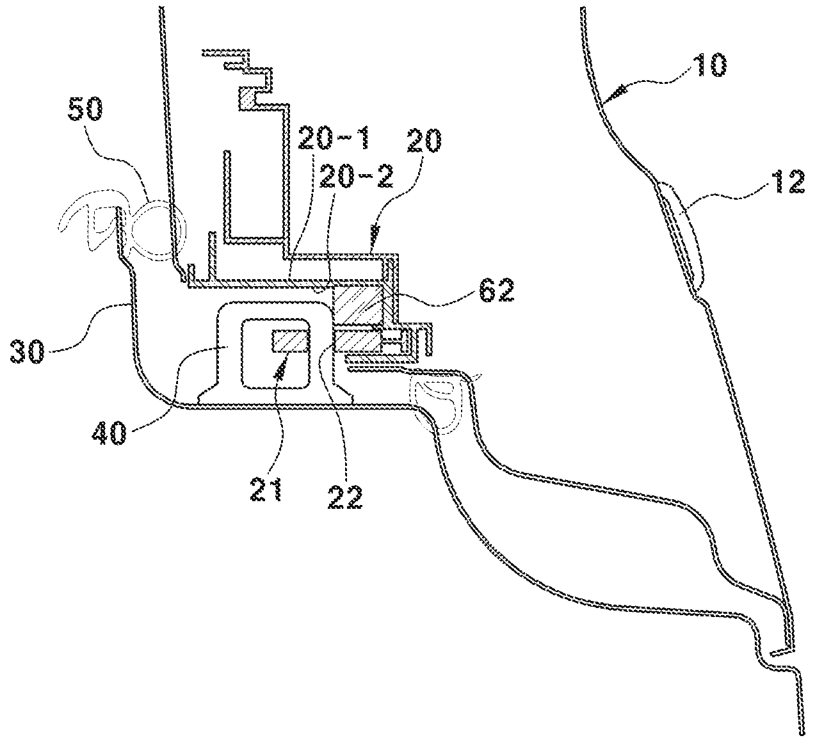
FIG. 5 is a transverse cross-sectional view illustrating the vehicular door-opening-and-closing device according to embodiments of the present invention, in which the striker is lockably fitted into the latch and adheres to a permanent magnet mounted to the latch when the door is closed.

Referring to FIG. 5, when the door 10 is closed in the state in which the permanent magnet 62 is mounted on the inner surface 20-2 of the latch case 20-1 adjacent to the claw 21 of the latch 20, the striker 40 mounted to the vehicle body 30 is lockably fitted into the engaging groove 22 formed in the claw 21 of the latch 20.

Accordingly, when the door 10 is closed, the permanent magnet 62 magnetically pulls the striker 40 and then adheres to the striker 40 mounted to the vehicle body, thereby reducing the resistance of the door 10 when the door 10 is closed and thus improving the closing performance of the door 10.

Figure 6:
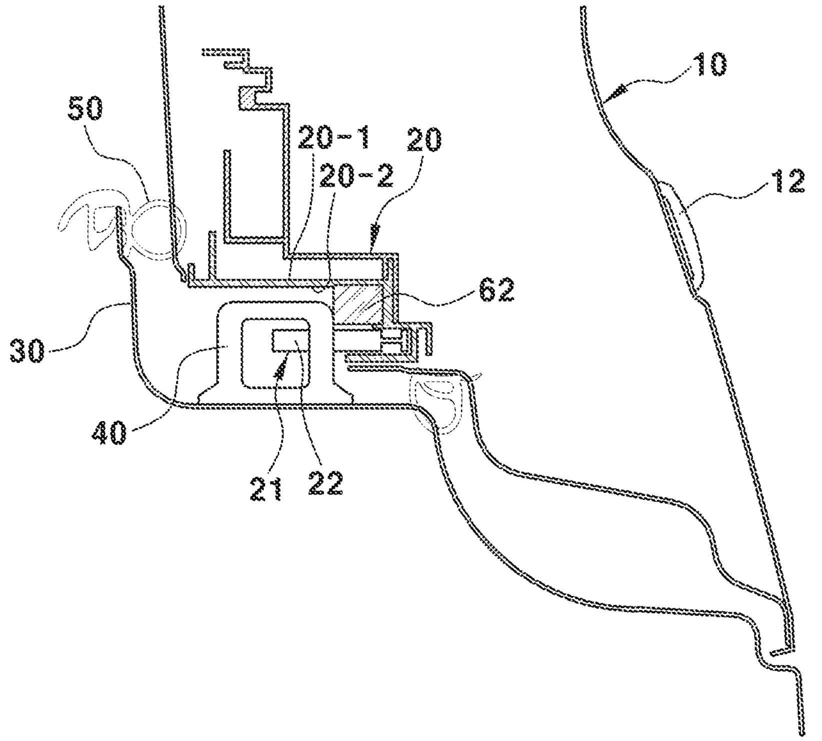
FIG. 6 is a transverse cross-sectional view illustrating the vehicular door-opening-and-closing device according to embodiments of the present invention, in which the striker continuously adheres to the permanent magnet mounted to the latch when an operation for opening the door is performed.

Referring to FIG. 6, when an operation for opening the door 10 is performed, the claw 21 of the latch 20 is rotated in a locking-releasing direction such that the striker 40 is ready to escape from the engaging groove 22 in the claw 21.

At this point, even though the repulsive force of the weather strip 50 acts on the door 10, the striker 40 is maintained in the state of being fitted into the engaging groove 22 in the claw 21 of the latch 20 by virtue of the magnetic force of the permanent magnet 62.

Therefore, the door 10 is capable of being continuously maintained in the state of being in close contact with the weather strip 50 so as to prevent vibration without being pushed in the opening direction by the repulsive force of the weather strip 50.

Accordingly, because the door 10 is maintained in the state of being in close contact with the weather strip 50 so as to prevent vibration without being pushed in the opening direction, it is possible to diminish or prevent amplification of vibration and operational sound caused by rotation of the claw 21 and the pawl 24 of the latch in the locking-releasing direction through the internal space in the door panel and thus to greatly reduce the amount of noise that is generated when the door 10 is opened.

Furthermore, because the striker 40 is continuously positioned in the engaging groove 22 in the claw 21 of the latch by virtue of the magnetic force of the permanent magnet 62, it is possible to prevent the phenomenon that would otherwise occur, in which the door 10 is pushed in the opening direction by the repulsive force of the weather strip 50 and a contact sound is generated when the striker 40 momentarily escapes from the engaging groove 22 in the claw 21 of the latch 20, and thus it is possible to further reduce the amount of noise that is generated when the door 10 is opened.

Figure 7:
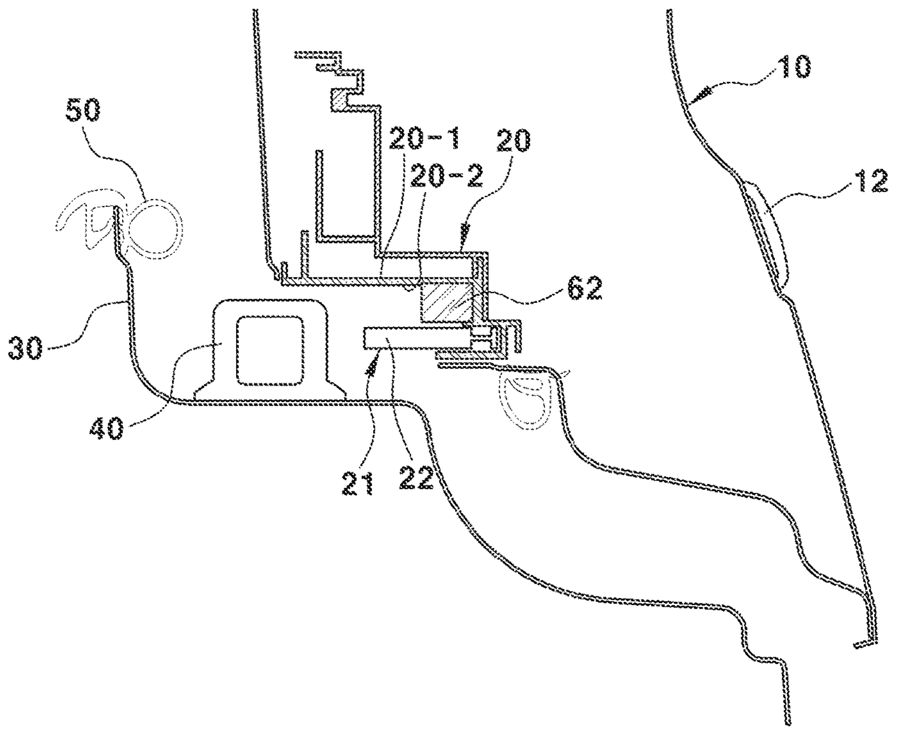
FIG. 7 is a transverse cross-sectional view illustrating the vehicular door-opening-and-closing device according to embodiments of the present invention, in which the door is opened by pulling a door lever after the striker is maintained in the state of adhering to the permanent magnet mounted to the latch when the operation for opening the door is performed.

Referring to FIG. 7, because the claw 21 of the latch 20 is rotated in the locking-release direction such that the striker 40 can escape from the engaging groove 22 in the claw 21, when the door lever 12 of the door 10 is pulled by a user, the striker 40 is separated from the permanent magnet 62 such that the door 10 can be opened to a desired position.

In other words, when a user pulls the door lever 12 in the opening direction using force exceeding the magnetic force of the permanent magnet 62, the striker 40 easily escapes from the engaging groove 22 in the claw 21, thereby allowing the door 10 to be easily opened.

Meanwhile, when the magnet 60 is embodied as an electromagnet 64, the electromagnet 64 is mounted at a location of the latch at which the electromagnet 64 can attract the striker 40 using the magnetic force thereof.

Figure 8:
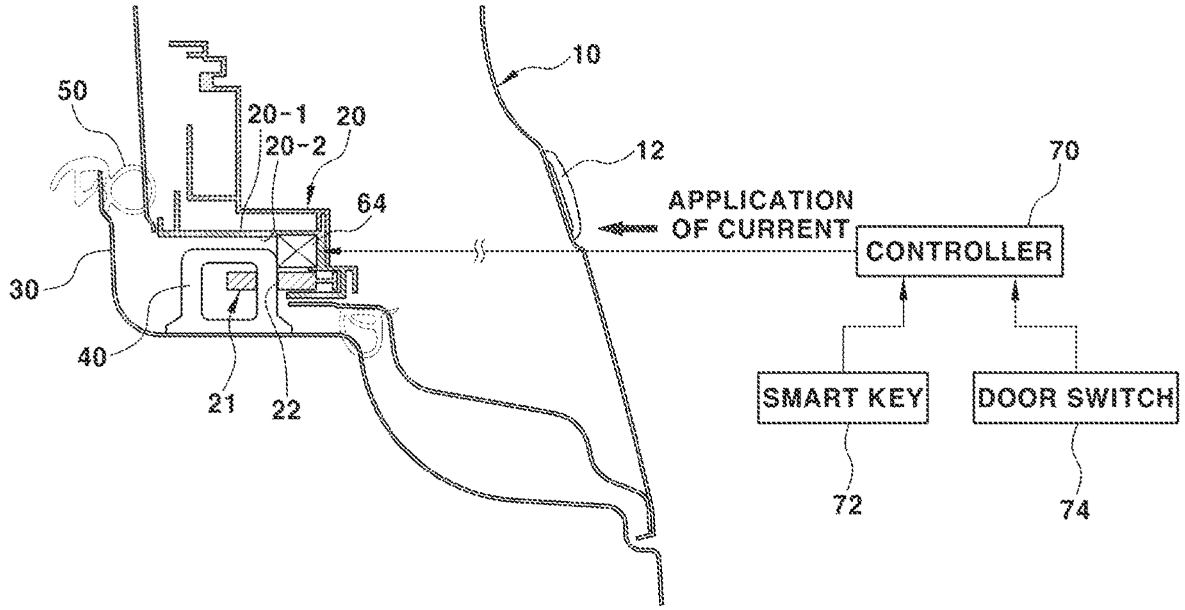
FIG. 8 is a transverse cross-sectional view illustrating the vehicular door-opening-and-closing device according to embodiments of the present invention, in which the striker is lockably fitted into the latch and adheres to the electromagnet mounted to the latch when the door is closed.
Figure 10:
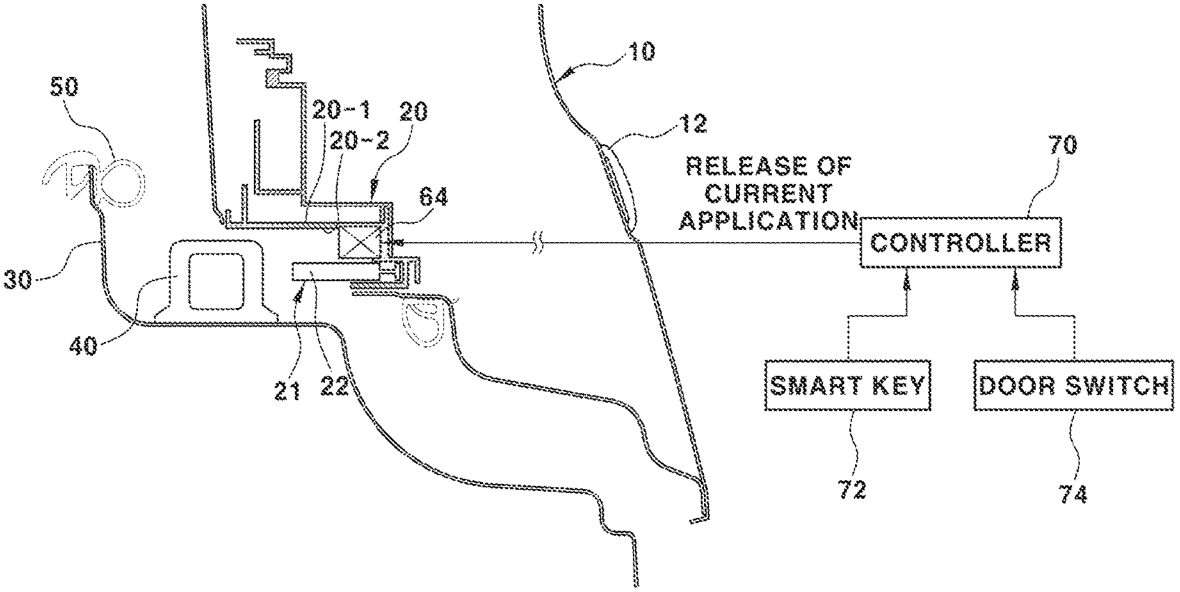
FIG. 10 is a transverse cross-sectional view illustrating the vehicular door-opening-and-closing device according to embodiments of the present invention, in which the door is opened by pulling a door lever after the striker is maintained in the state of adhering to the electromagnet mounted to the latch when the operation for opening the door is performed.

Specifically, the electromagnet 64 may be mounted on the inner surface 20-2 of the latch case 20-1 adjacent to the claw 21 of the latch 20, into which the striker 40 is lockably fitted, as illustrated in FIGS. 8 and 10.

Alternatively, although not shown in the drawings, the electromagnet 64 may also be mounted in a region of the striker 40 so as to magnetically attract the latch 20 when the striker 40 is fitted into the latch 20.

Here, a controller 70 may be connected to the electromagnet 64 so as to apply current to the electromagnet 64 for magnetization of the electromagnet 64. A signal indicating opening of the door 10 from a smart key 72 or a switching signal indicating closing of the door 10 from a door switch 74 may be transmitted to the controller 70.

For reference, the door switch 74 is mounted at a determined position on the vehicle body so as to be pushed by the pressure of the door 10 and then to output the switching signal to the controller 70 when the door 10 is closed.

Accordingly, when the controller 70 receives a signal indicating opening of the door 10 from the smart key 72 or receives a switching signal from the door switch 74 when the door 10 is closed and pushes the door switch 74, the controller 70 may perform control to apply current to the electromagnet 64 for magnetization.

Referring to FIG. 8, when the door 10 is closed in the state in which the electromagnet 64 is mounted on the inner surface 20-2 of the latch case 20-1 adjacent to the claw 21 of the latch 20, the striker 40 mounted to the vehicle body 30 is lockably fitted into the engaging groove 22 formed in the claw 21 of the latch 20.

When the door 10 is closed and pushes the door switch 74 and the switching signal is thus transmitted to the controller 70, the controller 70 applies current to the electromagnet 64 to magnetize the electromagnet 64.

Accordingly, because the electromagnet 64 magnetically attracts the striker 40 and the electromagnet 64 mounted to the door 10 adheres to the striker 40 mounted to the vehicle body 30 when the door 10 is closed, it is possible to reduce the resistance when the door 10 is closed and thus to improve the closing performance of the door 10.

Figure 9:
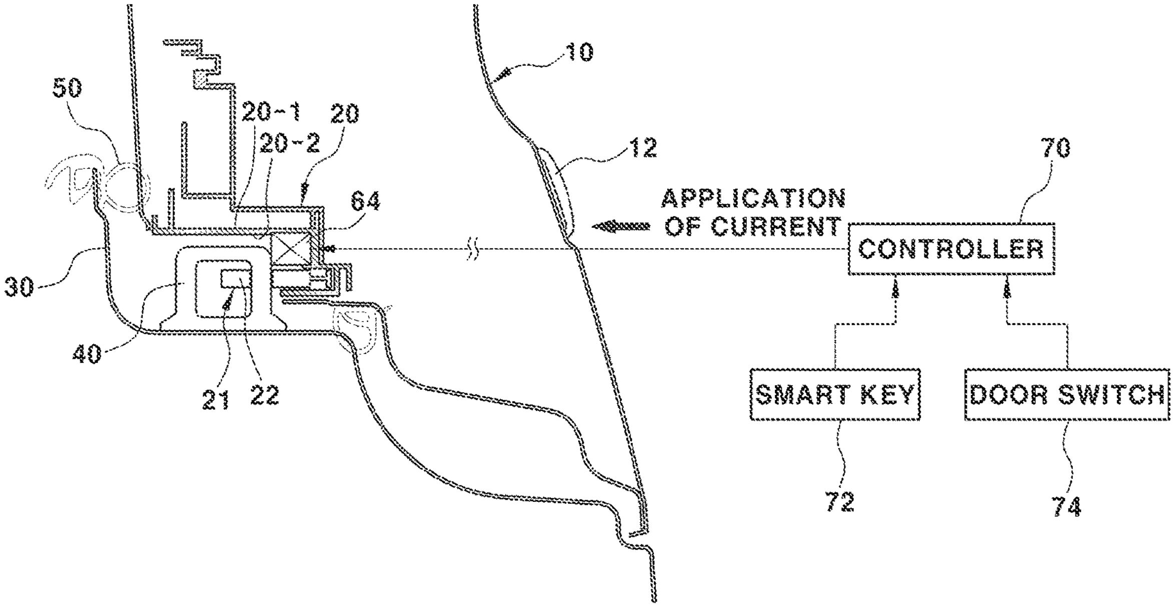
FIG. 9 is a transverse cross-sectional view illustrating the vehicular door-opening-and-closing device according to embodiments of the present invention, in which the striker continuously adheres to the electromagnet mounted to the latch when the operation for opening the door is performed.

Referring to FIG. 9, when an operation of opening the door 10 is performed (for example, when the unlocking button of the smart key is pushed), the claw 21 of the latch 20 is rotated in the unlocking direction such that the striker 40 can escape from the engaging groove 22 in the claw 21.

At this point, the controller 70 receives a signal indicating opening of the door 10 from the smart key 72 and applies current to the electromagnet 64 to magnetize the electromagnet 64.

Here, although the repulsive force of the weather strip 50 is continuously applied to the door 10, the striker 40 is maintained in the state of being fitted in the engaging groove 22 in the claw 21 of the latch 20 by virtue of the magnetic force of the electromagnet 64.

Consequently, the door 10 is capable of being maintained in the state of being in close contact with the weather strip 50 so as to prevent vibration without being pushed in the opening direction by the repulsive force of the weather strip 50.

Accordingly, because the door 10 is maintained in the state of being in close contact with the weather strip 50 so as to prevent vibration without being pushed, it is possible to diminish or prevent amplification of vibration and an operational sound, which are generated when the claw 21 and the pawl 24 of the latch 20 are rotated in the unlocking direction, through the internal space in the door panel, and to greatly reduce the amount of noise that is generated when the door 10 is opened.

Furthermore, because the striker 40 is continuously positioned in the engaging groove 22 in the claw 21 of the latch 20 by virtue of the magnetic force of the electromagnet 64, it is possible to prevent the phenomenon which would otherwise occur, in which a contact sound is generated when the door 10 is pushed in the opening direction and thus the striker 40 momentarily escapes from the engaging groove 22 in the claw 21 of the latch 20 due to the repulsive force of the weather strip 50, and thus to further reduce the amount of noise that is generated when the door 10 is opened.

Referring to FIG. 10, because the claw 21 of the latch 20 is rotated in the unlocking direction such that the striker 40 can escape from the engaging groove 22 in the claw 21, when a user pulls the door lever 12 of the door 10 in the opening direction, the striker 40 is separated from the electromagnet 64, thereby allowing the door 10 to be easily opened to a desired position.

In other words, when a user pulls the door lever 12 in the opening direction using force exceeding the magnetic force of the electromagnet 64, the striker 40 easily escapes from the engaging groove 22 in the claw 21, thereby allowing the door 10 to be easily opened.

By virtue of the above-described construction of the embodiments, embodiments of the present invention offer the following effects.

First, even though the repulsive force of the weather strip is applied to the door when the operation of the pawl and the claw of the latch for opening of the door is performed, the striker is continuously positioned in the engaging groove in the claw by virtue of the magnetic force of the magnet, and the door is maintained in the state of being in close contact with the weather strip so as to prevent vibration. Consequently, it is possible to prevent vibration and an operational sound, which are generated when the pawl and the claw are rotated, from being amplified through the internal space in the door, and it is thus possible to greatly reduce the amount of noise that is generated when the door is opened.

Second, even though the repulsive force of the weather strip is applied to the door when the operation of the pawl and the claw of the latch for opening the door is performed, the striker is continuously positioned in the engaging groove in the claw by virtue of the magnetic force of the magnet. Consequently, it is possible to prevent a phenomenon which would otherwise occur, in which a contact sound is generated when the door is pushed in the opening direction by the repulsive force of the weather strip and the striker momentarily escapes from the engaging groove in the claw of the latch, and it is thus possible to further reduce the amount of noise that is generated when the door is opened.

Third, even though the repulsive force of the weather strip is applied to the door after the operation of the pawl and the claw of the latch is performed for opening of the door, the striker is continuously positioned in the engaging groove in the claw by virtue of the magnetic force of the magnet. Thereafter, when a user pulls the door lever in the opening direction using force exceeding the magnetic force of the magnet, the striker easily escapes from the engaging groove in the claw, thereby allowing the door to be easily opened.

Fourth, when the claw of the latch is locked to the striker to close the door, the claw is attracted to the striker by the magnetic force of the magnet, thereby reducing resistance to closing of the door and thus improving the closing performance of the door.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A door-opening-and-closing device for a vehicle, the vehicle having a door and a compressible weather strip mounted in a region of a surface of a body portion of the vehicle for sealing the door, the device comprising:

a latch;

a striker configured to be lockably fitted into an engaging groove of the latch when the door of vehicle is closed; and a permanent magnet configured to be mounted at a predetermined location of the body portion of the vehicle or the door, the permanent magnet configured to maintain the striker in a state of being fitted into the latch by magnetic attraction between the permanent magnet and the striker, wherein the permanent magnet has a magnetic force exceeding a repulsive force of the weather strip generated by compression of the weather strip and wherein the magnetic force exceeds the repulsive force in an initial operation of opening a vehicle door.

2. The device of claim 1, wherein the permanent magnet is mounted at a location on the latch at which the permanent magnet can attract the striker using the magnetic force of the permanent magnet.

3. The device of claim 1, wherein the latch comprises a latch case and a claw into which the striker is lockably fitted, and wherein the permanent magnet is mounted on an inner surface of the latch case adjacent to the claw of the latch.

4. The device of claim 1, wherein the permanent magnet is mounted at a location of the striker at which the permanent magnet can attract the latch.

5. The device of claim 1, wherein the permanent magnet is mounted at a location of the latch at which the permanent magnet can attract the striker.

6. A door-opening-and-closing device for a vehicle, the vehicle having a door and a compressible weather strip mounted in a region of a surface of a body portion of the vehicle for sealing the door, the device comprising:

a latch;

a striker configured to be lockably fitted into the latch when the door of vehicle is closed; and an electromagnet configured to be mounted at a predetermined location of the body portion of the vehicle or the door, the electromagnet configured to maintain the striker in a state of being fitted into the latch by magnetic attraction between the electromagnet and the striker, wherein the electromagnet has a magnetic force exceeding a repulsive force of the weather strip generated by compression of the weather strip and wherein the magnetic force exceeds the repulsive force in an initial operation of opening a vehicle door.

7. The device of claim 6, wherein the latch comprises a latch case and a claw into which the striker is lockably fitted, and wherein the electromagnet is mounted on an inner surface of the latch case adjacent to the claw of the latch.

8. The device of claim 6, wherein the electromagnet is mounted at a location of the striker at which the electromagnet can attract the latch.

9. The device of claim 6, further comprising a controller configured to apply current to the electromagnet for magnetization of the electromagnet.

10. The device of claim 9, wherein the controller is configured to apply current to the electromagnet upon receiving a signal indicating opening of a door from a smart key.

11. The device of claim 9, wherein the controller is configured to apply current to the electromagnet upon receiving a switching signal from a door switch in response to the door switch being pushed by a door that has closed.

12. A vehicle comprising:

a vehicle body;

a door coupled to the vehicle body;

a weather strip disposed along an opening of the vehicle body;

a latch mounted on the door;

a striker mounted on the vehicle body and configured to be lockably fitted into an engaging groove of the latch when the door is closed; and a magnet configured to be mounted at a predetermined location of the vehicle body or the door, the magnet configured to maintain the striker in a state of being fitted into the latchky magnetic attraction between the magnet and the striker, wherein the magnet has a magnetic force exceeding a repulsive force of the weather strip generated by compression of the weather strip and wherein the magnetic force exceeds the repulsive force in an initial operation of opening the door.

13. The vehicle of claim 12, wherein the magnet comprises a permanent magnet, and wherein the permanent magnet is mounted at a location on the latch at which the magnet can attract the striker using the magnetic force of the magnet.

14. The vehicle of claim 12, wherein:

the magnet comprises a permanent magnet;

the latch comprises a latch case and a claw into which the striker is lockably fitted; and the permanent magnet is mounted on an inner surface of the latch case adjacent to the claw of the latch.

15. The vehicle of claim 12, wherein the magnet comprises a permanent magnet, and wherein the permanent magnet is mounted at a location of the striker at which the permanent magnet can attract the latch.

16. The vehicle of claim 12, wherein:

the magnet comprises an electromagnet;

the latch comprises a latch case and a claw into which the striker is lockably fitted; and the electromagnet is mounted on an inner surface of the latch case adjacent to the claw of the latch.

17. The vehicle of claim 12, wherein the magnet comprises an electromagnet and wherein the electromagnet is mounted at a location of the striker at which the electromagnet can attract the latch.

18. The vehicle of claim 12, wherein the magnet comprises an electromagnet, and wherein the vehicle further comprises a controller configured to apply current to the electromagnet for magnetization of the electromagnet upon receiving a signal indicating opening of the door from a smart key or upon receiving a switching signal from a door switch in response to the door switch being pushed by the door that has closed.

19. The device of claim 9, wherein the latch comprises a latch case and a claw into which the striker is lockably fitted, and wherein the electromagnet is mounted on an inner surface of the latch case adjacent to the claw of the latch.

20. The device of claim 9, wherein the electromagnet is mounted at a location of the striker at which the electromagnet can attract the latch.

* * * * *